US008809662B2

(12) United States Patent
Tanaka

(10) Patent No.: US 8,809,662 B2
(45) Date of Patent: Aug. 19, 2014

(54) MUSICAL PERFORMANCE TRAINING APPARATUS, MUSICAL PERFORMANCE TRAINING METHOD, AND COMPUTER READABLE MEDIUM

(71) Applicant: Casio Computer Co., Ltd., Tokyo (JP)

(72) Inventor: Takahiro Tanaka, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/741,723

(22) Filed: Jan. 15, 2013

(65) Prior Publication Data

US 2013/0186258 A1 Jul. 25, 2013

(30) Foreign Application Priority Data

Jan. 20, 2012 (JP) .................................. 2012-010058

(51) Int. Cl.
*G09B 15/00* (2006.01)
(52) U.S. Cl.
USPC ........................................................ 84/470 R
(58) Field of Classification Search
USPC ........................................................ 84/470 R
See application file for complete search history.

(56) References Cited

U.S. PATENT DOCUMENTS

| | | | | |
|---|---|---|---|---|
| 6,107,559 A * | 8/2000 | Weinstock et al. | ............ | 84/634 |
| 6,495,747 B2 * | 12/2002 | Shimaya et al. | ............ | 84/477 R |
| 7,332,664 B2 * | 2/2008 | Yung | ............ | 84/470 R |
| 7,435,891 B2 * | 10/2008 | Perla | ............ | 84/470 R |
| 7,525,035 B2 * | 4/2009 | Katsuta | ............ | 84/609 |
| 7,579,541 B2 * | 8/2009 | Guldi | ............ | 84/470 R |
| 7,663,044 B2 * | 2/2010 | Katsuta | ............ | 84/470 R |
| 7,806,759 B2 * | 10/2010 | McHale et al. | ............ | 463/7 |
| 7,848,699 B2 * | 12/2010 | Ohshima et al. | ............ | 434/307 R |
| 8,076,564 B2 * | 12/2011 | Applewhite | ............ | 84/477 R |
| 8,119,896 B1 * | 2/2012 | Smith | ............ | 84/470 R |
| 8,213,640 B2 * | 7/2012 | Chalupper et al. | ............ | 381/118 |
| 8,338,684 B2 * | 12/2012 | Pillhofer et al. | ............ | 84/470 R |
| 8,515,334 B1 * | 8/2013 | Wendkos et al. | ............ | 434/350 |
| 8,629,342 B2 * | 1/2014 | Lee et al. | ............ | 84/610 |
| 2004/0035284 A1 * | 2/2004 | Tamura et al. | ............ | 84/634 |
| 2005/0244799 A1 * | 11/2005 | Skenandore | ............ | 434/238 |
| 2006/0090626 A1 * | 5/2006 | Harrison | ............ | 84/47 |
| 2013/0186258 A1 * | 7/2013 | Tanaka | ............ | 84/465 |

FOREIGN PATENT DOCUMENTS

JP 3266934 B2 1/2002

* cited by examiner

*Primary Examiner* — Robert W Horn
(74) *Attorney, Agent, or Firm* — Holts Holtz Goodman & Chick PC

(57) ABSTRACT

A musical performance training apparatus of the present invention receives an input of a note of a musical sound; stores a keying frequency received during a predetermined unit time to be associated with a practice status variable (such as a single-hand partial practice); evaluates motivation change of a user based on the keying frequency stored for every identical practice status variable; evaluates a musical performance technique level change of a user based on the keying frequency stored for every identical practice status variable; and generates advice based on the motivation change thus evaluated and the musical performance level change for every practice status variable.

18 Claims, 15 Drawing Sheets

FIG.4

| | |
|---|---|
| REINFORCEMENT LEARNING AGENT 1 | |
| REINFORCEMENT LEARNING AGENT 2 | |
| ... | |
| REINFORCEMENT LEARNING AGENT (PRACTICE STATUS NUMBER) | |

| | |
|---|---|
| motivation | DEGREE OF MOTIVATION CHANGE |
| improvement | DEGREE OF CHANGE OF MUSICAL PERFORMANCE TECHNIQUE |
| action | ACTION IDENTIFICATION VARIABLE |
| prevMotivation | PREVIOUS DEGREE OF MOTIVATION CHANGE |
| prevImprovement | PREVIOUS DEGREE OF CHANGE OF MUSICAL PERFORMANCE TECHNIQUE |
| prevAction | PREVIOUS ACTION IDENTIFICATION VARIABLE |
| achievN | ACTION NUMBER |
| note | KEYING FREQUENCY PER UNIT TIME |
| cost | LEVEL OF DIFFICULTY OF A TRACK |
| alpha | LEARNING RATE |
| gamma | DISCOUNT RATE |
| useful | USEFULNESS COEFFICIENT |
| value [motivation][improvement][action] | RULE VALUE |

FIG.16

| MUSICAL PERFORMANCE TECHNIQUE STATUS VARIABLE \ MOTIVATION STATUS VARIABLE | 0 (LOW) | 1 (CONSTANT) | 2 (HIGH) |
| --- | --- | --- | --- |
| 2 (HIGH) | ADVICE 9 | ADVICE 5 | ADVICE 12 |
| 1 (CONSTANT) | ADVICE 2 | ADVICE 4 | ADVICE 15 |
| 0 (LOW) | ADVICE 1 | ADVICE 2 | ADVICE 5 |

_MUSICAL PERFORMANCE TRAINING APPARATUS, MUSICAL PERFORMANCE TRAINING METHOD, AND COMPUTER READABLE MEDIUM_

This application is based upon and claims the benefit of priority from the prior Japanese Patent Application No. 2012-010058, filed Jan. 20, 2012, and the entire contents of which are incorporated herein by reference.

BACKGROUND OF THE INVENTION

1. Field of the Invention

The present invention relates to a musical performance training apparatus, a musical performance training method, and a computer readable medium.

2. Related Art

Conventionally, a technology has been proposed which presents instructional information to a player when practicing an instrument for a musical performance. For example, Japanese Patent No. 3266934 discloses technology including identifying a type of an inappropriate musical performance operation (for example, a mistake on a keying operation or a mistake on the timing in a case of practicing a keyboard instrument), counting the number of inappropriate musical performance operations thus identified for each type, and presenting, as instructional information, evaluations for musical performance operations in accordance with the number of inappropriate musical performances thus counted for each type.

Japanese Patent No. 3266934 basically presents instructional information defined in advance based on a musical performance result and it is sufficient to let the player recognize the musical performance result. However, it is doubtful whether it is possible to present instructional information that can improve the player's musical performance in the future.

For example, in a case in which a player is highly motivated or has high musical performance skill, it is likely to affect the player's future musical performance practice in a positive way by letting the player know the musical performance result and giving advice to the player to improve it. On the other hand, in a case in which the player is not motivated or has low musical performance skill, it may affect the player in a negative way.

In this way, it is necessary to take into account the change of the player's motivation or musical performance technique level to give advice to the player effectively; however, those matters have not been taken into account by the conventional methods.

SUMMARY OF THE INVENTION

Therefore, it is an object of the present invention to provide a musical performance training apparatus, a musical performance training method, and a computer readable medium that can present effective advice by changing advice in accordance with the change in a player's motivation and the change of a player's musical performance technique level.

In order to achieve the object, a musical performance training apparatus of an aspect of the present invention includes:

a receiver that receives note data of a musical sound supplied according to operation of a musical performance manipulandum by a player;

a calculator that calculates a musical performance operation frequency based on the note data received by the receiver every predetermined period of time elapsed;

a storage controller that stores in predetermined memory, each time the musical performance operation frequency is calculated by the calculator, the musical performance operation frequency calculated to be associated with any one of a plurality of practice forms;

an evaluator that evaluates a motivation change and a musical performance technique level change of the player based on a latest musical performance operation frequency stored in the memory and a musical performance operation frequency which is stored in the memory before the latest musical performance operation frequency is stored, for each of identical practice forms; and an advice generator that generates advice based on the motivation change and the musical performance technique level change thus evaluated for each of the practice forms.

Furthermore, a musical performance training method according to an aspect of the present invention includes:

receiving note data of a musical sound supplied according to operation of a musical performance manipulandum by a player;

calculating a musical performance operation frequency based on the note data received every predetermined period of time elapses;

storing in predetermined memory, each time the musical performance operation frequency is calculated, the musical performance operation frequency calculated to be associated with any one of a plurality of practice forms;

evaluating a motivation change and a musical performance technique level change of the player based on a latest musical performance operation frequency stored in the memory and a musical performance operation frequency which is stored in the memory before the latest musical performance operation frequency is stored, for each of identical practice forms; and generating advice based on the motivation change and the musical performance technique level change thus evaluated for each of the practice forms.

Furthermore, a computer readable medium according to an aspect of the present invention that is encoded with a software enables a computer included in a musical performance evaluation apparatus to execute the steps of:

receiving note data of a musical sound supplied according to operation of a musical performance manipulandum by a player;

calculating a musical performance operation frequency based on the note data received every predetermined period of time elapses;

storing in predetermined memory, each time the musical performance operation frequency is calculated, the musical performance operation frequency calculated to be associated with any one of a plurality of practice forms;

evaluating a motivation change and a musical performance technique level change of the player based on a latest musical performance operation frequency stored in the memory and a musical performance operation frequency which is stored in the memory before the latest musical performance operation frequency is stored, for each of identical practice forms;

and generating advice based on the motivation change and the musical performance technique level change thus evaluated for each of the practice forms.

BRIEF DESCRIPTION OF THE DRAWINGS

FIG. 4 is a diagram illustrating a structure of reinforcement learning agent data according to an embodiment of the present invention;

FIG. 16 is a diagram illustrating an example of advice selected in a musical performance training apparatus according to an embodiment of the present invention.

DETAILED DESCRIPTION OF THE INVENTION

In the following, embodiments of the present invention are explained with reference to the drawings.

Figure 1:
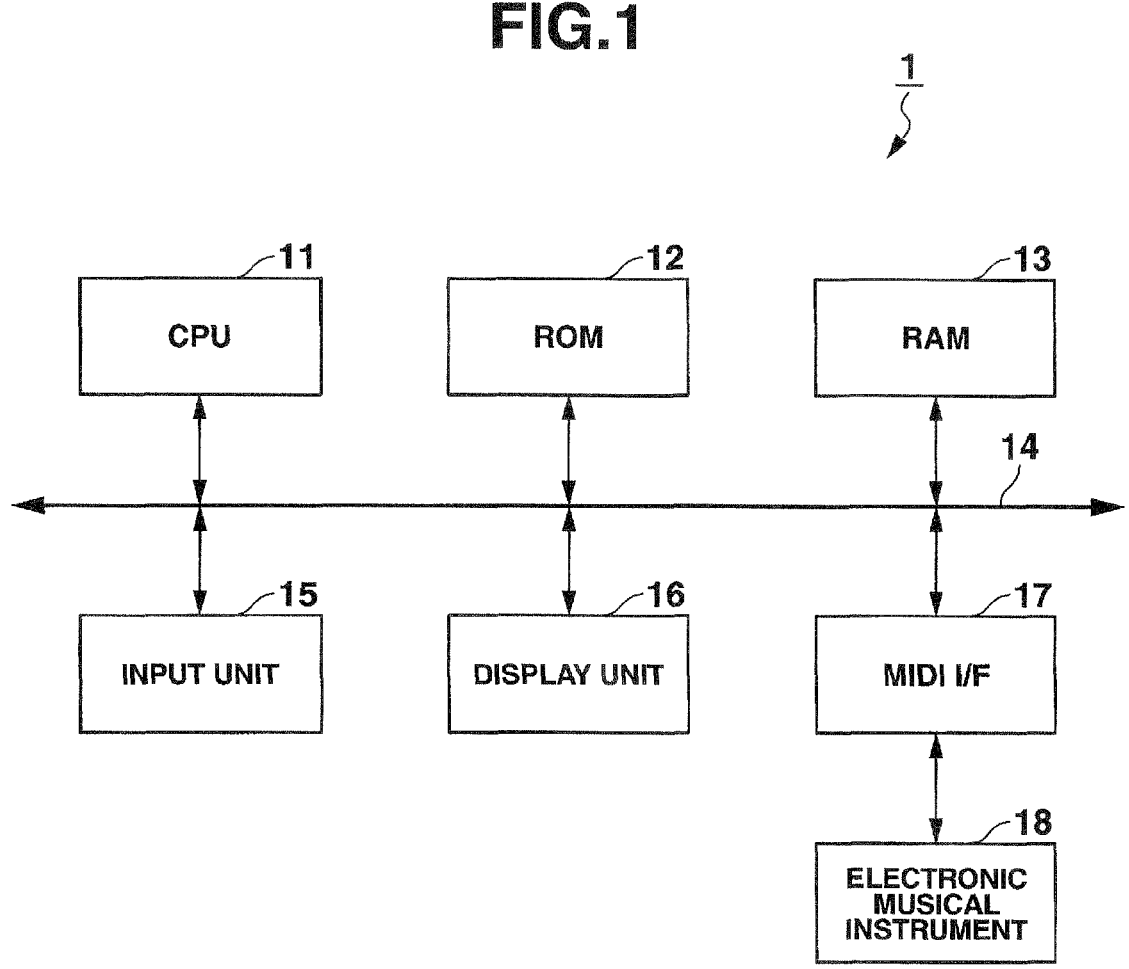
FIG. 1 is a block diagram illustrating a hardware configuration of a musical performance training apparatus according to an embodiment of the present invention.

FIG. 1 is a block diagram illustrating a hardware configuration of a musical performance training apparatus according to an embodiment of the present invention.

The musical performance training apparatus 1 is provided with a CPU (Central Processing Unit) 11, ROM (Read Only Memory) 12, RAM (Random Access Memory) 13, a bus 14, an input unit 15, a display unit 16, a MIDI (Musical Instrument Digital Interface) interface 17, and an electronic musical instrument 18.

The CPU 11 controls the overall musical performance training apparatus 1 and executes various processing in accordance with programs stored in the ROM 12 or programs read from the ROM 12 into the RAM 13.

The ROM 12 stores processing programs for various processing executed by the CPU 11. Furthermore, the RAM 13 stores programs and the like read from the ROM 12.

The CPU 11, ROM 12, and RAM 13 are connected to each other via the bus 14. Furthermore, the input unit 15, display unit 16, and MIDI interface 17 are also connected to the bus 14.

The input unit 15 is configured with buttons and the like, for example, and receives the input of various information in accordance with an operational instruction from a user.

The display unit 16 displays information and the like relating to various setting information and music playing movements in accordance with the control by the CPU 11.

The MIDI interface 17 is connected to the electronic musical instrument 18. The MIDI interface 17 sends music playing data relating to a sample music performance and the like to the electronic musical instrument 18.

The electronic musical instrument 18 transmits pitch data generated from a player's musical performance operation to the MIDI interface 17.

Figure 2:
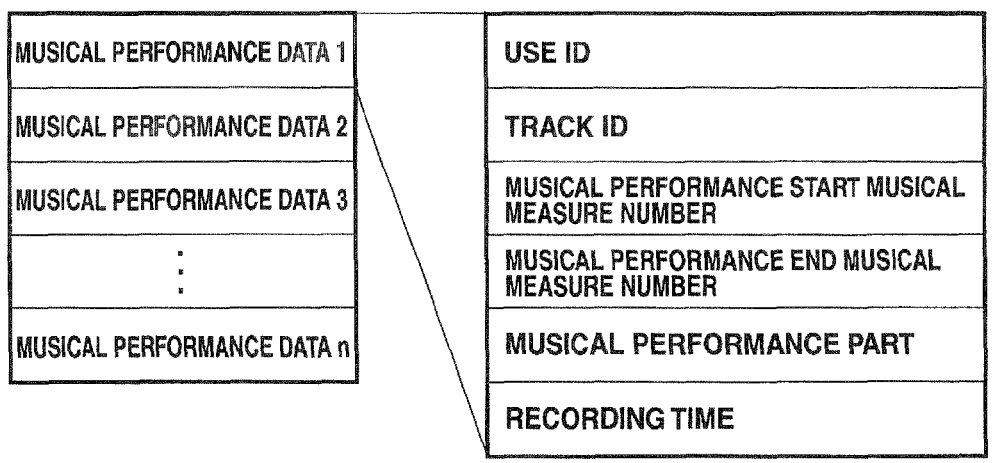
FIG. 2 is a diagram illustrating a structure of a musical performance data table according to an embodiment of the present invention.

FIG. 2 is a diagram illustrating a structure of a musical performance data table according to an embodiment of the present invention.

The musical performance data table is stored in the RAM 13 and is composed of n number of musical performance data, which is musical performance data 1 to musical performance data n. The respective musical performance data is composed of a user ID, a track ID, a musical performance start musical measure number, a musical performance end musical measure number, a musical performance part, and a recording time.

The user ID is a character string for identifying a user playing the electronic musical instrument 18. The track ID is a character string for identifying a track played on the electronic musical instrument 18. The musical performance start musical measure number is a musical measure number at which a musical performance is started by a player on a musical score of the music designated by the track ID. The musical performance end musical measure number is a musical measure number at which a musical performance is ended by a player on a musical score of the music designated by the track ID. The musical performance part is a value indicating a musical performance approach from the musical performance start musical measure number to the musical performance end musical measure, i.e. a value identifying a right-hand part, a left-hand part, a both-hand part, a mixed part of a single hand and both hands. The recording time is a time when musical performance data is recorded in the musical performance data table.

Figure 3:
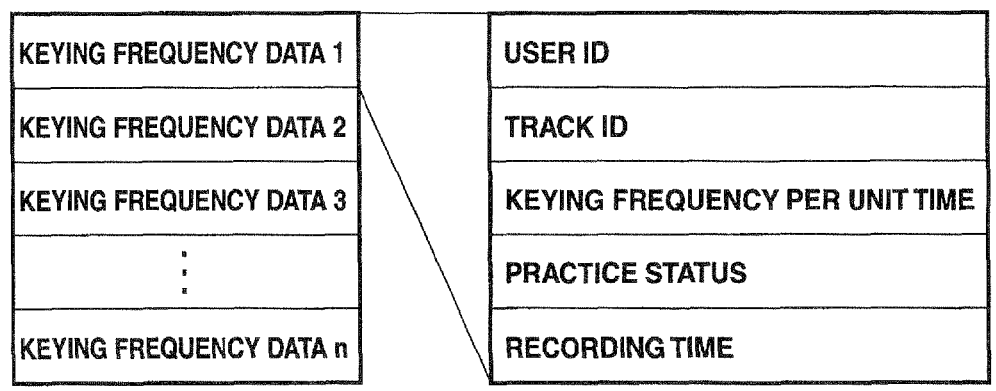
FIG. 3 is a diagram illustrating a structure of a keying (pressed-key) frequency data table according to an embodiment of the present invention.

FIG. 3 is a diagram illustrating a structure of a keying (pressed-key) frequency data table according to an embodiment of the present invention.

The keying frequency data table is stored in the RAM 13 and is composed of the n number of the keying frequency data, which is keying frequency number data 1 to keying frequency number data n. The respective keying frequency data is composed of a user ID, a track ID, keying frequency per unit time, a practice status, a recording time, and a musical performance time.

The user ID is a character string for identifying a user playing the electronic musical instrument 18. The track ID is a character string for identifying a track played in the electronic musical instrument 18. The keying frequency per unit time is a number of pitch data generated from the electronic musical instrument 18 by a musical performance at a predetermined unit time. The practice status is a value indicating a practice status of a player at a predetermined unit time, i.e. a value for identifying six types of practice statuses of a single-hand partial practice, a single-hand/both-hand mixed partial practice, a both-hand partial practice, a single-hand whole practice, a single-hand/both-hand mixed whole practice, and a both-hand whole practice. The recording time is a time when note data is recorded in a note data table.

FIG. 4 is a diagram illustrating a structure of reinforcement learning agent data according to an embodiment of the present invention.

The reinforcement learning agent data is defined for each of the abovementioned six types of practice statuses, and each reinforcement learning agent data includes motivation (degree of motivation change), improvement (degree of improvement of musical performance technique), action (action identification variable), prevMotivation (previous degree of motivation change), prevImprovement (previous degree of improvement of musical performance), prevAction (previous action identification variable), AchievN (action number), note (keying frequency per unit time), cost (level of difficulty of a track), alpha (learning rate), gamma (discount rate), useful (usefulness coefficient), and value[motivation][improvement][action] (rule value).

Figure 5:
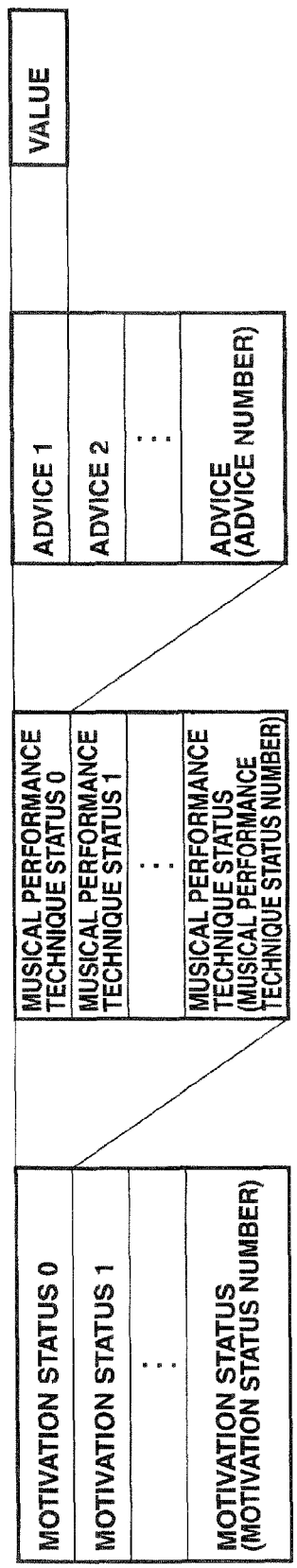
FIG. 5 is a diagram illustrating a structure of rule value data according to an embodiment of the present invention.

FIG. 5 is a diagram illustrating a structure of rule value data according to an embodiment of the present invention.

The rule value data is a detailed data structure of value [motivation][improvement][action](rule value) of FIG. 4, and advice 1 to n (n represents the advice number) are associated with each of the combinations of a motivation status and a musical performance technique status, and furthermore a value is associated for the respective advice.

As described later, in the present embodiment, the number of motivation statuses (motivation status variable) is three (0 (low), 1 (constant), 2 (high)) and the number of musical performance technique statuses (musical performance technique status variable) is three (0 (low), 1 (constant), 2 (high)). The total number of combinations is nine.

Figure 6:
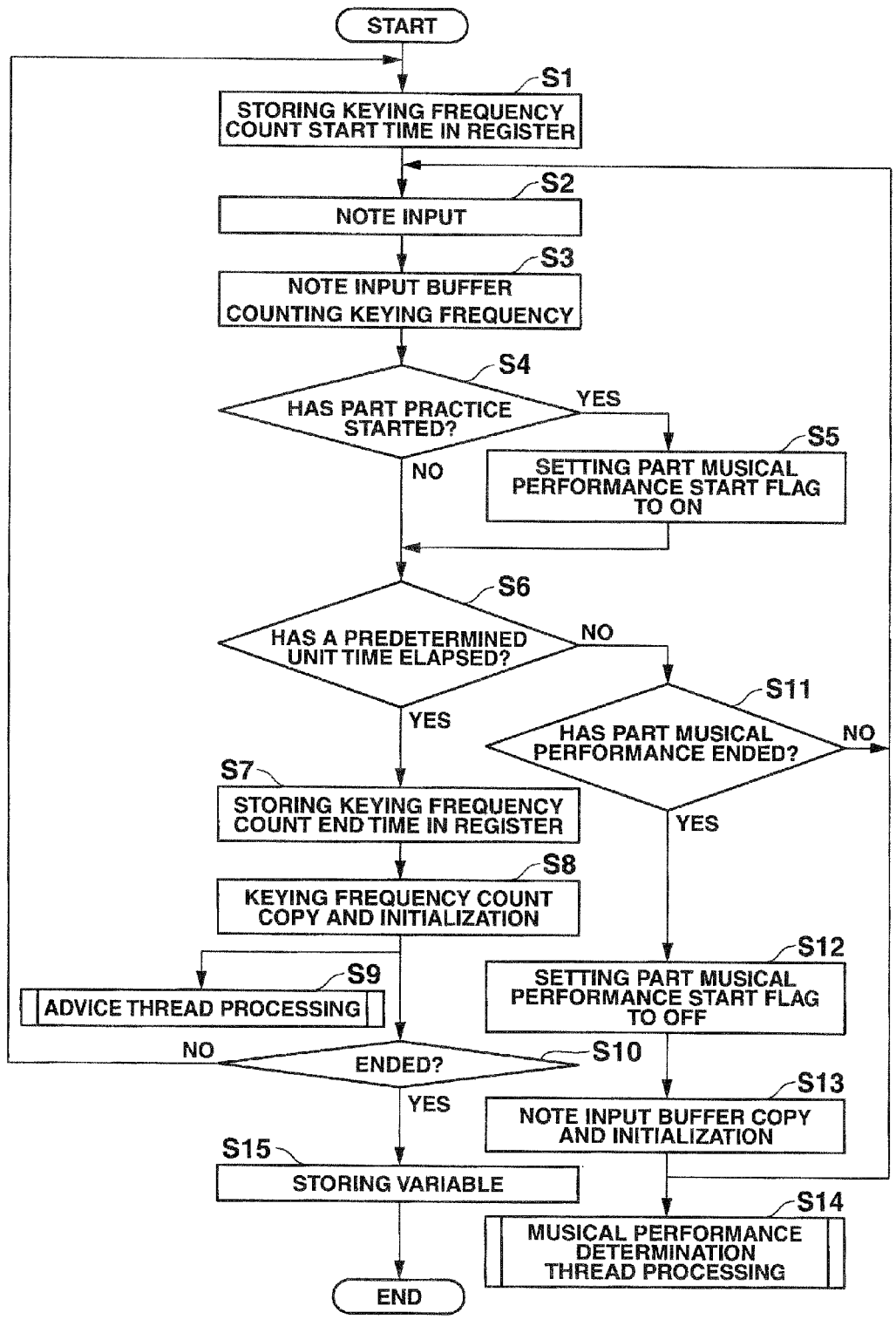
FIG. 6 is a flowchart illustrating a main flow executed in a musical performance training apparatus according to an embodiment of the present invention.

FIG. 6 is a flowchart illustrating a main flow executed in a musical performance training apparatus according to the present invention.

In Step 1, the CPU 11 stores a keying frequency count start time in a register. In Step 2, the CPU 11 receives a note input. More specifically, the CPU 11 receives pitch data generated from the electronic musical instrument 18 by the musical performance via the MIDI interface 17.

In Step S3, the CPU 11 inputs note data to a note input buffer and counts the keying frequency. More specifically, the note data is data for distinguishing to which key a certain pitch corresponds on a keyboard. Furthermore, upon counting the keying frequency, the CPU 11 adds the keying frequency to a keying frequency count variable each time the note data is inputted to the note input buffer.

In Step S4, the CPU 11 determines whether a part practice has been started. In a case of a YES determination, the CPU 11 advances the processing to Step S5, and in a case of a NO determination, the CPU 11 advances the processing to Step S6. More specifically, the CPU 11 determines whether an initial note input was done after the initialization of the note input buffer.

In Step S5, the CPU 11 sets the part musical performance start flag to ON. This part musical performance star flag is provided in the RAM 13. Furthermore, the CPU 11 sets the part musical performance start flag to ON, and stores a musical performance start time in the register.

In Step S6, the CPU 11 determines whether a predetermined unit time has elapsed. In a case of a YES determination, the CPU 11 advances the processing to Step S7, and in a case of a NO determination, the CPU 11 advances the processing to Step S11.

In Step S7, the CPU 11 stores the keying frequency count end time in the register.

In Step 8, the CPU 11 executes keying frequency count copy and initialization. More specifically, the CPU 11 copies the keying frequency stored in the keying frequency count variable to a predetermined area and initializes the keying frequency count variable. When the processing of Step S8 ends, the CPU 11 advances the processing to Steps S9 and S10.

In Step S9, the CPU 11 executes advice thread processing described later.

In Step S10, the CPU 11 determines whether the practice has ended. For example, the CPU 11 determines whether or not the practice end if there are no new note inputs for a predetermined period of time (for example, two minutes). In a case of a YES determination, the CPU 11 advances the processing to Step S15, and in a case of a NO determination, the CPU 11 advances the processing to Step S1.

In Step S11, the CPU 11 determines whether the part musical performance has ended. More specifically, the CPU 11 determines that the part musical performance ends if no pitch data is received for a predetermined period of time (for example, 5 seconds) via the MIDI interface 17 from the electronic musical instrument 18. In a case of a YES determination, the CPU 11 advances the processing to Step S12, and in a case of a NO determination, the CPU 11 advances the processing to Step S2.

In Step S12, the CPU 11 sets the part musical performance start flag to OFF.

In Step S13, the CPU 11 executes note input buffer copy and initialization. More specifically, the CPU 11 copies note data stored in the note input buffer to a predetermined area in the RAM 13 and initializes the note input buffer. When the processing of Step S13 ends, the CPU 11 advances the processing to Step S14 and S2.

In Step S14, the CPU 11 executes musical performance data determination thread processing described later.

In Step S15, the CPU 11 stores the variable in the RAM 13 and ends the main flow.

Figure 7:
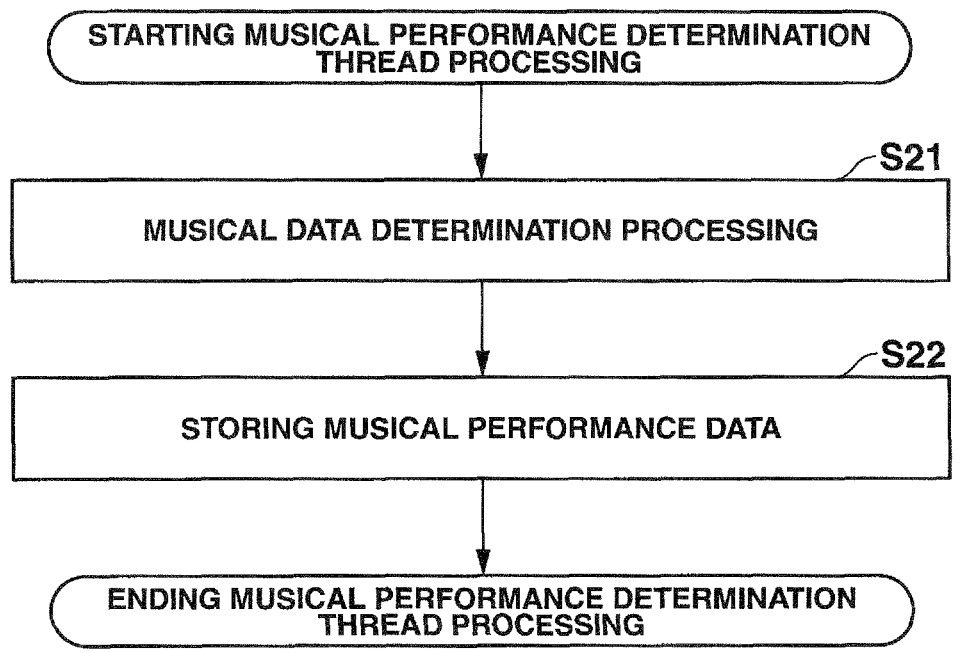
FIG. 7 is a flowchart illustrating musical performance data determination thread processing executed in a musical performance training apparatus according to an embodiment of the present invention.

FIG. 7 is a flowchart illustrating musical performance data determination thread processing executed in a musical performance training apparatus according to an embodiment of the present invention.

In Step S21, the CPU 11 executes musical performance data determination processing. More specifically, the CPU 11 determines to which part of the music the note data stored in the RAM 13 in Step 13 of FIG. 6 corresponds. That is to say, the CPU 11 determines a musical performance start musical measure and a musical performance end musical measure in the music of the note data thus stored, by comparing with note data of the entire music. Furthermore, the CPU 11 determines a musical performance part from the musical performance start musical measure to the musical performance end musical measure. That is to say, the CPU 11 determines that the musical performance part is either one of a right-hand part, a left-hand part, a both-hand part, and a mixed part of a single hand and both hands.

In Step S22, the CPU 11 stores musical performance data. More specifically, the CPU 11 stores a user ID, a track ID, a musical performance start musical measure, a musical performance end musical measure, a musical performance part, and a recording time as musical performance data in the musical performance data table. As a storing method, the data is added at the end of the musical data table. For example, when the m number of musical performance data from the musical performance data 1 to the musical performance data m is stored in the musical performance table, the data is stored in a storage area subsequent to the musical performance data m.

Figure 8:
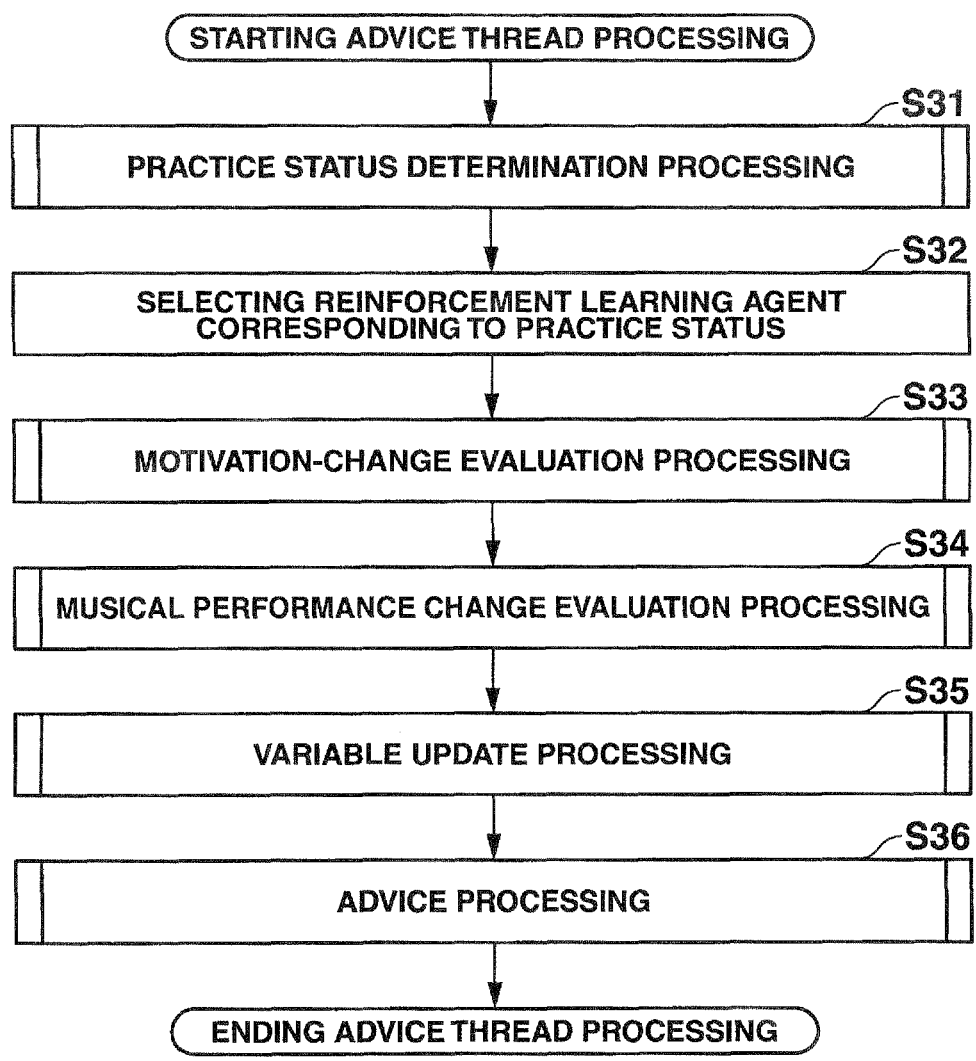
FIG. 8 is a flowchart illustrating advice thread processing executed in a musical performance training apparatus according to an embodiment of the present invention.

FIG. 8 is a flowchart illustrating advice thread processing executed in a musical performance training apparatus according to an embodiment of the present invention.

In Step S31, the CPU 11 executes practice status determination processing as described later, and in Step S32, the CPU 11 selects a reinforcement learning agent corresponding to a practice status. More specifically, the CPU 11 selects reinforcement learning agent data corresponding to a practice status variable updated in Step S59 of FIG. 9 from the reinforcement learning agent data (see FIG. 4) stored in the RAM 13.

In Step S33, the CPU 11 executes motivation-change evaluation processing as described later, in Step S34, the CPU 11 executes musical performance technique change evaluation processing as described later, in Step S35, the CPU 11 executes variable updating processing as described later, and in Step S36, the CPU 11 executes advice processing as described later.

Figure 9:
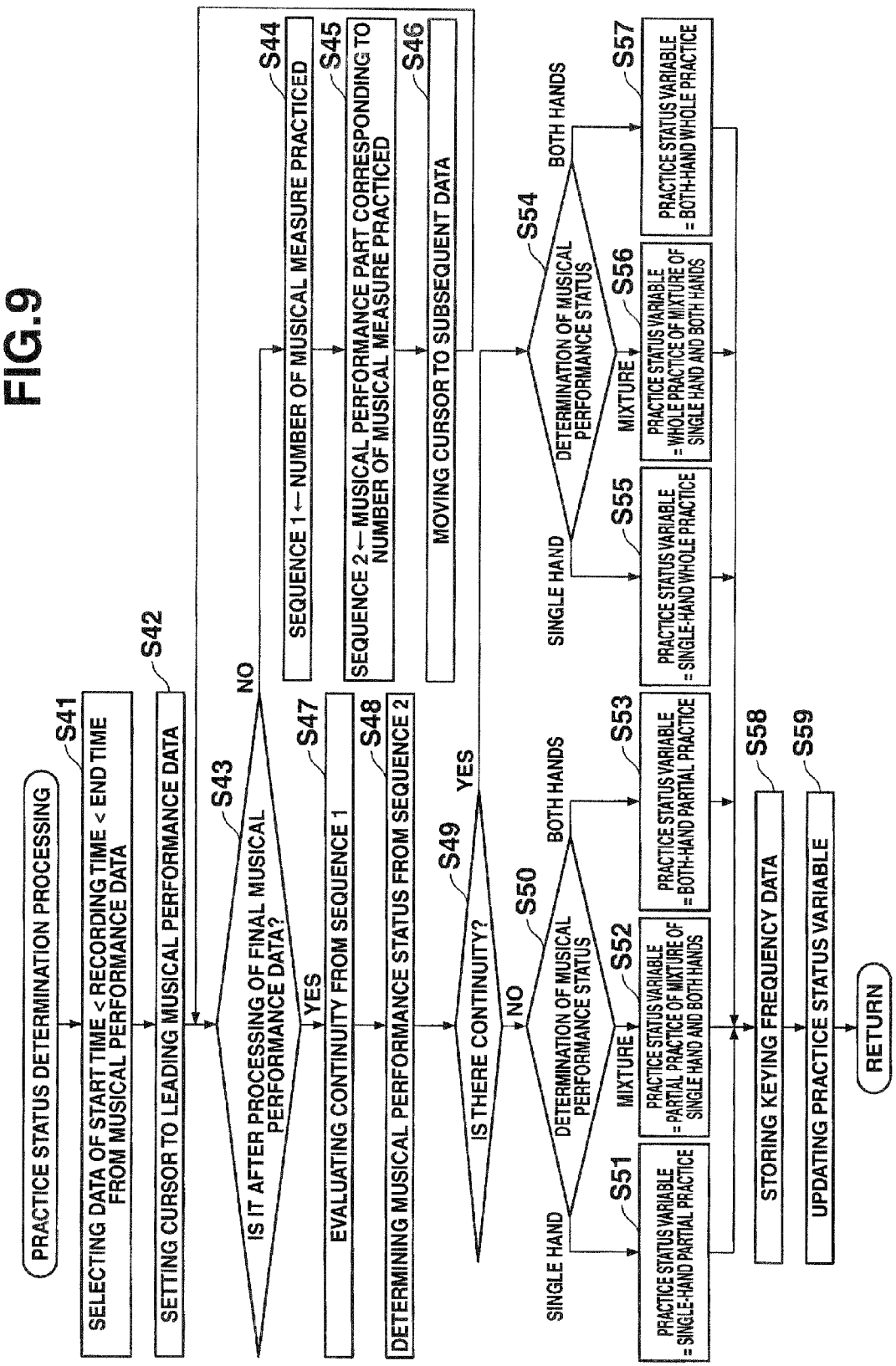
FIG. 9 is a flowchart illustrating practice status determination processing executed in a musical performance training apparatus according to an embodiment of the present invention.

FIG. 9 is a flowchart illustrating practice status determination processing executed in a musical performance training apparatus according to an embodiment of the present invention.

In Step S41, the CPU 11 selects data of Start time<recording time<end time from musical performance data. More specifically, the CPU 11 selects musical performance data in which a plurality of recording times of the musical performance data stored in the musical performance data table is behind the keying frequency count start time and prior to the keying frequency count end time. Here, the keying frequency count start time and the keying frequency count end time are stored in the register in Step S1 and Step S7 of FIG. 6, respectively. Therefore, the data is read from the register when selecting the musical performance data.

In Step S42, the CPU 11 sets a cursor to leading musical performance data. More specifically, the CPU 11 sets leading musical performance data among the musical performance data selected in Step S41 as a processing target of Step S44 and Step S45 described later.

In Step S43, the CPU 11 determines whether it is after the processing of final musical performance data. That is to say, the CPU 11 determines whether it is after the processing of tail-end musical performance data among the musical performance data selected in Step S41. In a case of a YES determination, the CPU 11 advances the processing to Step S47, and in a case of a NO determination, the CPU 11 advances the processing to Step S44.

In Step S44, the CPU 11 stores the number of musical measures practiced in Sequence 1. For example, the CPU 11 stores all of the numbers from a musical performance start musical measure number to a musical performance end musical measure number stored in the musical performance data as a processing target. For example, when the number of the musical performance start musical measure is "1" and the number of the musical performance end musical measure is "4", the CPU 11 stores the numbers "1, 2, 3, and 4" in Sequence 1. Sequence 1 is stored in a predetermined area in the RAM 13.

In Step S45, the CPU 11 stores a musical performance part corresponding to the number of musical measures practiced in Sequence 2. More specifically, the CPU 11 stores a musical performance part stored in the musical performance data as a processing target. As described above, a musical performance part includes a right-hand part, a left-hand part, a both-hand part, and a mixed part of a single hand and both hands. Furthermore, the numbers "1", "2", "3", and "4" are used as identification character sequences for a right-hand part, a left-hand part, a both-hand part, and a mixed part of a single hand and both hands, respectively, for example. When a musical performance part of the musical data as a current processing target is a mixed part of a single hand and both hands, the number "4" is stored in Sequence 2.

In Step S46, the CPU 11 moves the cursor to subsequent musical performance data. More specifically, the CPU 11 sets the musical performance data that is the processing target of Step S44 and Step S45 as musical data stored in a musical performance data table subsequent to the musical performance data that is currently processed.

In Step S47, the CPU 11 evaluates continuity from Sequence 1. More specifically, the CPU 11 extracts musical measures stored in Sequence 1 and sorts in ascending order to evaluate the continuity. Here the continuity refers to a concept for identifying whether a practice of a music is a partial practice or a whole practice, and for example, it is determined that there is a continuity when the number of musical measures played continuously is at least a predetermined number of thresholds. For example, when the number of musical measures stored in Sequence 1 is "1, 2, 3, 4, 1, 2, 3, 4, 1, 2, 3, and 4" (when practicing the musical measures of 1 to 3 within a unit time three times), the order is "1, 1, 1, 2, 2, 2, 3, 3, 3, 4, 4, and 4" in the ascending order. Therefore, the continuity is incremented by 1 upon ascending from 1 to 2, incremented by 1 upon ascending from 2 to 3, incremented by 1 upon ascending from 3 to 4, a result of which the total thereof is 3. By comparing the value of the continuity with a predetermined threshold (for example, the maximum number of musical measures of music, 80% of the maximum number of musical measures of music, or the like), the CPU 11 determines whether it is a whole practice or a partial practice.

In Step S48, the CPU 11 determines a practice status in a unit time from Sequence 2. More specifically, the CPU 11 takes up a musical performance part identification number stored in Sequence 2 and determines a musical performance status. For example, when the musical performance part identification number stored in Sequence 2 is "3, 3, 3" (when practicing the both-hand part in a unit time three times), it is determined that the musical performance status is both hands. When the musical performance identification number stored in Sequence 2 is "1, 2, 3" (when practicing a right-hand part, a left-hand part, and a both-hand part one time in a unit time, respectively), it is determined that the musical performance status is in a mixture of a single hand and both hands.

In Step S49, the CPU 11 determines whether there is continuity. More specifically, the CPU 11 determines that there is continuity when it is evaluated as a whole practice in Step S47, and determines that there is not continuity when it is evaluated as a partial practice in Step S47. The CPU 11 advances the processing to Step S54 upon determining that there is continuity, and advances the processing to Step S50 upon determining that there is not continuity.

In Step 50, the CPU 11 determines the musical performance status. More specifically, the CPU 11 determines the musical performance status determined in Step S48. For example, the CPU 11 advances the processing to Step S51 in a case of the musical performance status being left hand, to Step 52 in a case of the musical performance status being a mixture of a single hand and both hands, and to Step S53 in a case of the musical performance status being both hands.

In Step S51, the CPU 11 sets the practice status variable as "single-hand partial practice". In Step S52, the CPU 11 sets the practice status variable as "partial practice of a mixture of a single hand and both hands". In Step S53, the CPU 11 sets the practice status variable as "both-hand partial practice".

In Step S54, the CPU 11 determines a musical performance status. More specifically, the CPU 11 determines a musical performance status determined in Step S48. For example, the CPU 11 advances the processing to Step S55 in a case of the musical performance status being left hand, to Step 56 in a case of the musical performance status being a mixture of a single hand and both hands, and to Step S57 in a case of the musical performance status being both hands.

In Step S55, the CPU 11 sets the practice status variable as "single-hand partial practice". In Step S56, the CPU 11 sets the practice status variable as "partial practice of a mixture of a single hand and both hands". In Step S57, the CPU 11 sets the practice status variable as "both-hand partial practice".

In Step S58, the CPU 11 stores the keying frequency data. More specifically, the CPU 11 stores a user ID, a track ID, a keying frequency per unit time, a practice status, and a recording time as keying frequency data in the keying frequency data table. Here, the keying frequency per unit time is a keying frequency copied in a predetermined area in the RAM 13 in Step S8 of FIG. 6. Furthermore, the practice status is a practice status variable determined in any of Step S51, S52, S53, S55, S56, and S57. As a storing method, the data is added at the end of the keying frequency data table. For example, when the m number of keying frequency data from the keying frequency data 1 to the keying frequency data m is stored in the note data table, the data is stored in a storage area subsequent to the keying frequency data m.

In Step S59, the CPU 11 updates the practice status variable. More specifically, the CPU 11 substitutes a practice status variable determined in any of Step S51, S52, S53, S55, S56, and S57 into the practice status variable stored in a predetermined area in the RAM 13.

Figure 10:
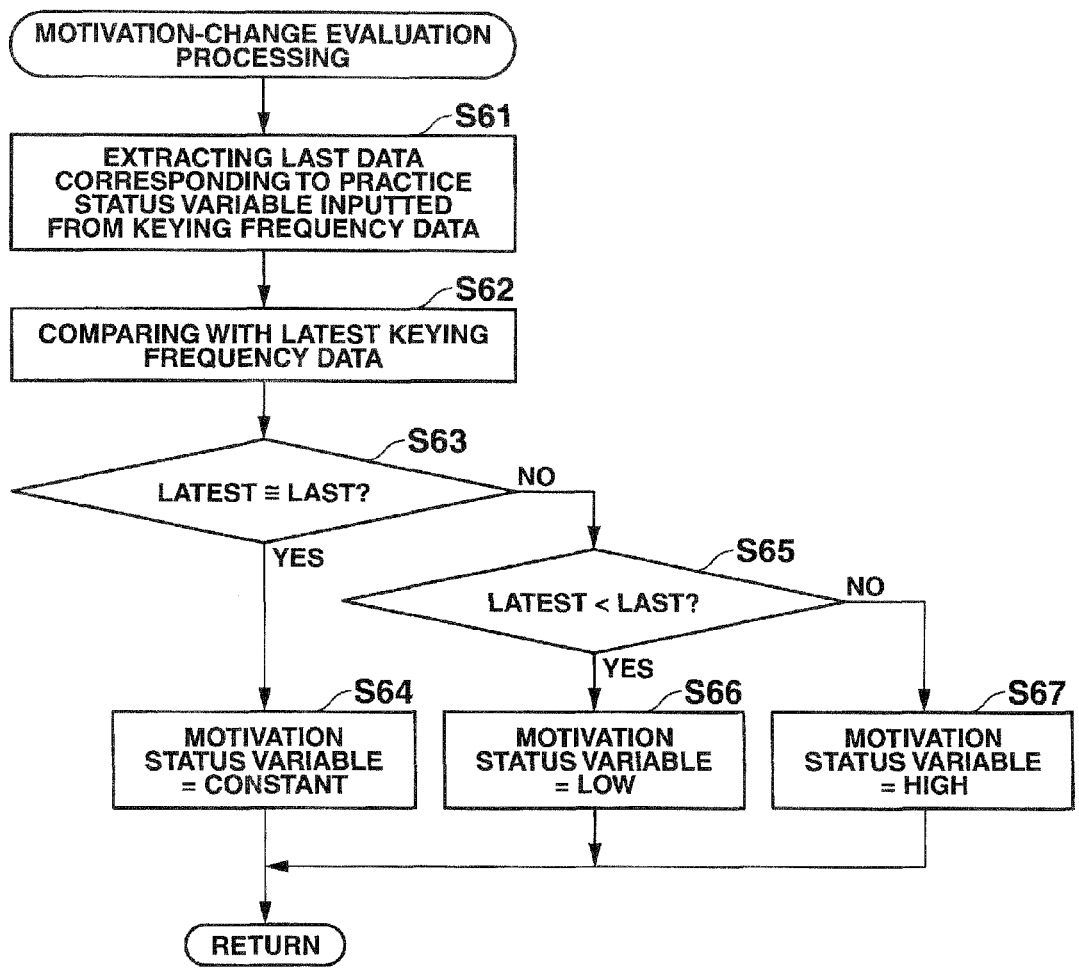
FIG. 10 is a flowchart illustrating motivation-change evaluation processing executed in a musical performance training apparatus according to an embodiment of the present invention.

FIG. 10 is a flowchart illustrating motivation-change evaluation processing executed in a musical performance training apparatus according to an embodiment of the present invention.

In Step S61, the CPU 11 extracts last data corresponding to the practice status variable inputted from the keying frequency data. More specifically, the CPU 11 retrieves the keying frequency data table using the practice status variable updated in Step S59 of FIG. 9 as a key and extracts the last keying frequency data corresponding to the practice status variable from keying frequency data, which is stored before the latest keying frequency data is stored.

In Step S62, the CPU 11 compares the latest keying frequency data with the last keying frequency data extracted in Step S61.

In Step S63, the CPU 11 determines whether the keying frequency of the latest keying frequency data is nearly equal to the keying frequency of the last keying frequency data. Here, the expression "nearly equal" means that, for example, a difference between the keying frequencies is within five. In a case of a YES determination at the processing of Step S63, the CPU 11 advances the processing to Step S64, and in a case of a NO determination in the processing of Step S63, the CPU 11 advances the processing to Step S65.

In Step S65, the CPU 11 determines whether the keying frequency of the latest keying frequency data is lower than the keying frequency of the last keying frequency data. In a case of a YES determination in the processing of Step 65, the CPU 11 advances the processing to Step S66, and in a case of a NO determination in the processing of Step S65, the CPU 11 advances the processing to Step S67.

The CPU 11 substitutes 1 (one) (constant) into a motivation status variable in Step S64, substitutes 0 (zero) (low) into a motivation status variable in Step S65, and substitutes 2 (two) (high) into a motivation status variable in Step S66.

Figure 11:
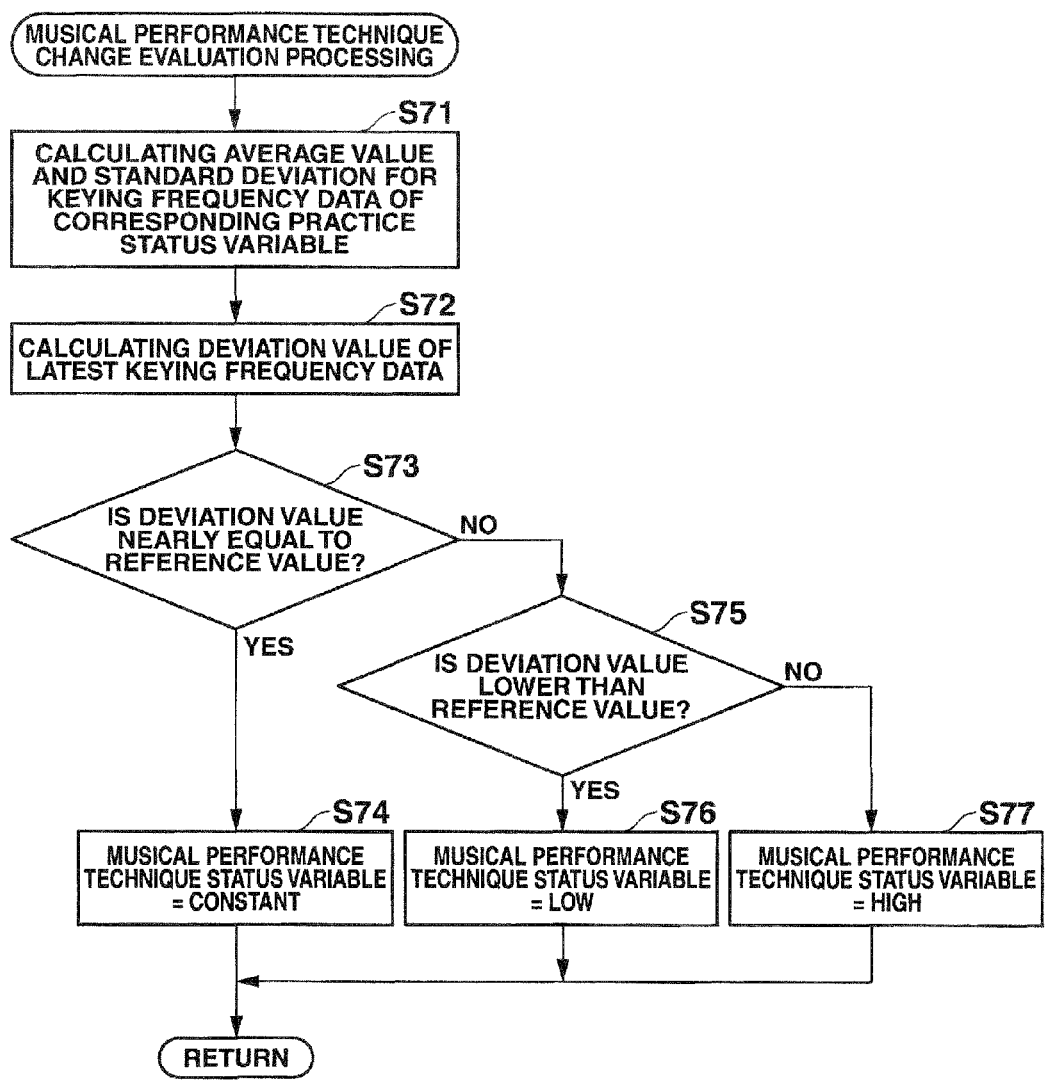
FIG. 11 is a flowchart illustrating musical performance technique change evaluation processing executed in a musical performance training apparatus according to an embodiment of the present invention.

FIG. 11 is a flowchart illustrating musical performance technique change evaluation processing executed in a musical performance training apparatus according to an embodiment of the present invention.

In Step S71, the CPU 11 calculates an average value and standard deviation for the keying frequency data of the corresponding practice status variable. More specifically, the CPU 11 retrieves the keying frequency data table using a practice status variable updated in Step S59 of FIG. 9 as a key, and extracts all of the keying frequency data corresponding to the practice status variable from the keying frequency data, which is stored before the latest keying frequency data is stored. Then, the CPU 11 calculates an average value and standard deviation for all of the keying frequency data.

In Step S72, the CPU 11 calculates a deviation value of the latest keying frequency data.

In Step S73, the CPU 11 determines whether a deviation value of the latest keying frequency data is nearly equal to a reference value. The reference value refers to a value calculated based on the average value and the standard deviation of the keying frequency data calculated in Step S71. In a case of a YES determination, the CPU 11 advances the processing to Step S74, and in a case of a NO determination, the CPU 11 advances the processing to Step S75.

In Step S75, the CPU 11 determines whether the deviation value of the latest keying frequency data is lower than the reference value. In a case of a YES determination in the processing of Step S75, the CPU 11 advances the processing to Step S76, and in a case of a NO determination in the processing of Step S75, the CPU 11 advances the processing to Step S77.

In Step S74, the CPU 11 substitutes 1 (one) (constant) into a musical performance technique status variable in Step S74, substitutes 0 (zero) (low) into a musical performance technique status variable in Step S76, and substitutes 2 (two) (high) into a musical performance technique status variable in Step S77.

Figure 12:
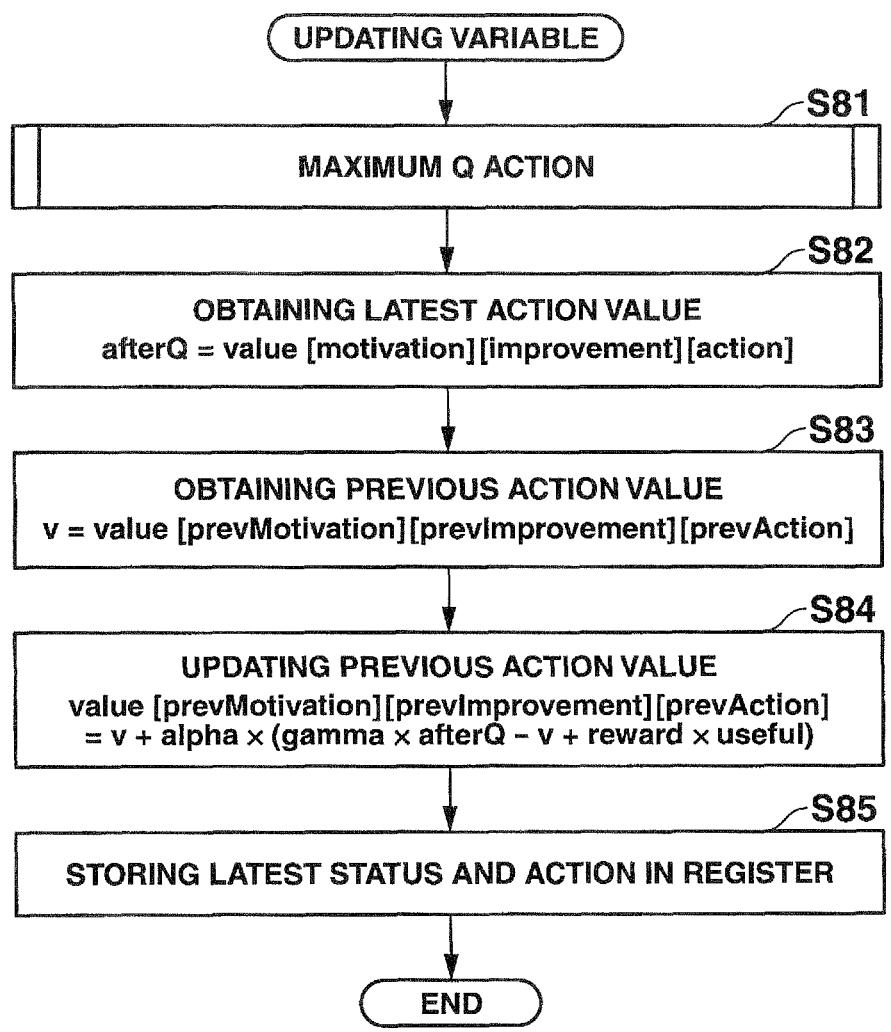
FIG. 12 is a flowchart illustrating variable updating processing executed in a musical performance training apparatus according to an embodiment of the present invention.

FIG. 12 is a flowchart illustrating variable updating processing executed in a musical performance training apparatus according to an embodiment of the present invention.

Q-learning, which is one type of reinforcement learning, has been known to work by acting in accordance with an existing rule so as to create a value function based on a reward from a result of the action as well as creating an optimum rule based on the existing value function.

The variable updating processing applies such a Q-leaning theory. More specifically, the CPU 11 updates a status value of a value function table 'value' from a result of a musical performance input (action) in accordance with existing advice, and obtains the most effective advice from the value function table value in accordance with the status variable thus updated.

In the following, an operation of such variable updating processing is explained with reference to FIG. 12.

In Step S81, the CPU 11 executes maximum Q action processing that retrieves the most effective (maximum Q action value 'maxQ') advice-type 'action' from the value function table 'value'[motivation][improvement][i], while performing a stepping operation of an action-number-retrieving pointer I, in a state of being designated by a motivation status variable 'motivation' and a musical performance technique status variable 'improvement'.

Then, in Step S82, the CPU 11 obtains, from the value function table 'value'[motivation][improvement][action], the latest action value 'afterQ' of the advice-type 'action' in the current status designated by the motivation status variable 'motivation' and the musical performance technique status variable 'improvement'. Then, in Step S83, the CPU 11 obtains, from the value function table 'value'[prevmotivation][previmprovement][prevAction], a previous value v of the previous advice-type 'prevAction' in the previous status designated by the motivation status variable 'prevmotivation' and the musical performance technique variable 'previmprovement'.

Then, in Step S84, the CPU 11 updates the previous status and the previous value v corresponding to the current value 'afterQ' in accordance with the following formula (I).

$$\text{value[prevmotivation][previmprovement][prevAction]} \leftarrow v + \text{alpha} \times (\text{gamma} \times \text{afterQ} - v + \text{reward} \times \text{useful}) \quad (1)$$

It should be noted that, in the formula (1), alpha refers to a learning rate, gamma refers to a discount rate, reward refers to a reward (degree of achievement 'achieveValue'), and useful refers to a usefulness coefficient.

Then, in Step S85, the CPU 11 stores the latest status and action in the register.

Figure 13:
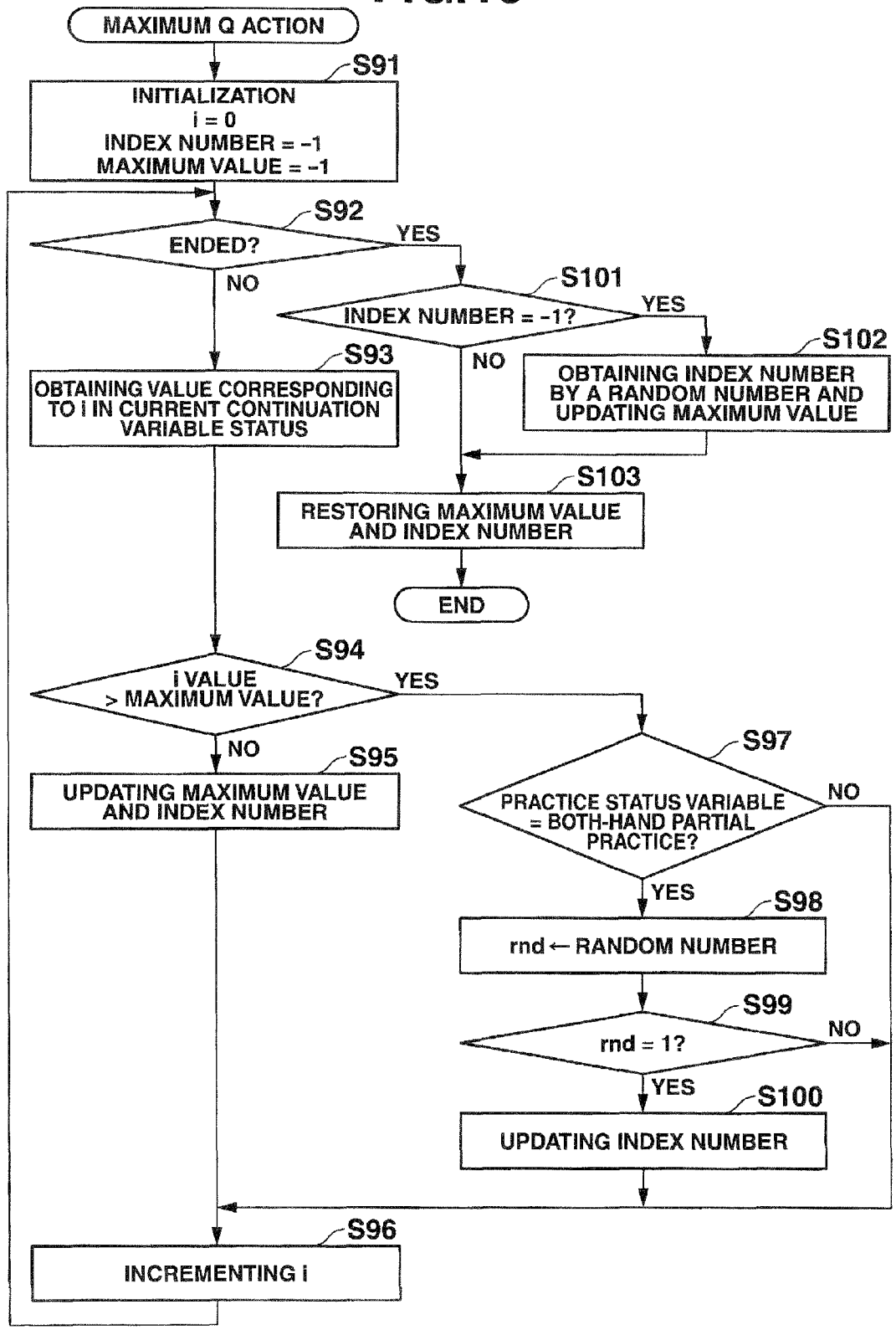
FIG. 13 is a flowchart illustrating maximum Q action processing executed in a musical performance training apparatus according to an embodiment of the present invention.

FIG. 13 is a flowchart illustrating maximum Q action processing executed in a musical performance training apparatus according to an embodiment of the present invention.

In Step S91, the CPU 11 performs zero clear on the action-number retrieving pointer i, and sets a maximum Q action value 'maxQ' and an action-type 'index' to "−1", respectively.

In Step S92, the CPU 11 determines whether retrieval of all of the actions has finished. In a case of not having finished retrieving, the determination result becomes "NO" and the processing advances to Step S93, and obtains an advice value q corresponding to the action-number retrieving pointer i from the value function table 'value'[motivation][improvement][i], in a state designated by the motivation status variable 'motivation' and the musical performance technique status variable 'improvement'.

Figure 14:
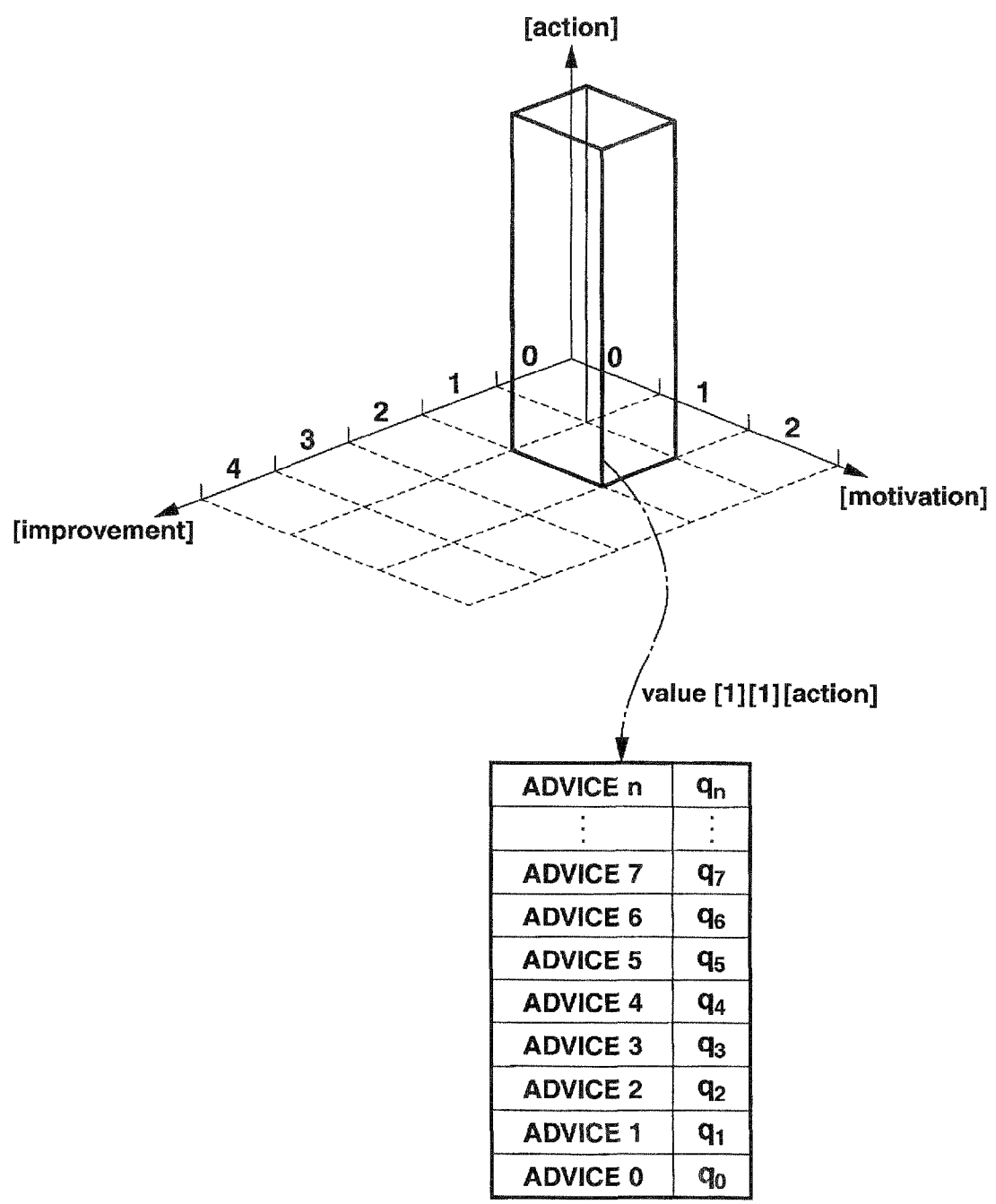
FIG. 14 is a diagram illustrating an example of a value function table 'value' according to an embodiment of the present invention.

Here, with reference to FIG. 14, processing of obtaining the advice value q (i value) corresponding to the action-number retrieving pointer i from the value function table 'value' in a state designated by the motivation status variable 'motivation' and the musical performance technique status variable 'improvement' is explained. For example, in a case of the motivation status variable 'motivation' being "1" and the technique status variable 'improvement' being "1", a plurality of actions (advice) and advice values $q_0$ to $q_n$, associated with the plurality of actions (advice) are registered in the value function table 'value'[1][1][action] as an example illustrated in FIG. 14, and in Step S93, the advice value q corresponding to the action-number retrieving pointer i is set to be read from the value function table 'value'[motivation][improvement][i].

Then, in subsequent Step S94, the CPU 11 determines whether the advice value q (i value) read from the value function table 'value'[motivation][improvement][i] is greater than the maximum Q action value 'maxQ' (maximum value). In a first pass, since the maximum Q action value 'maxQ' is "−1" in Step S91, the determination result becomes "NO", and the processing advances to Step S95. In Step S95, the CPU 11 updates an index number by retaining the action-number retrieving pointer i in the action-type index, and updates the maximum value by storing the advice value q read from the value function table 'value'[motivation][improvement][i] as the maximum Q action value 'maxQ', corresponding to the action-number retrieving pointer i.

Then, in Step S96, the CPU 11 returns the processing to the aforementioned Step S92 after incrementing the action-number retrieving pointer i and performing a stepping operation. Then, the CPU 11 reads the advice value q (i value) from the value function table 'value'[motivation][improvement][i] according to the stepping operation of the action-number retrieving pointer i, and when the advice value q thus read exceeds the maximum Q action value 'maxQ' (maximum value), the determination result in Step S94 becomes "YES" and the processing advances to Step S97.

In Step S97 to Step S100, the CPU 11 adds a randomly changing component in order to avoid monotonousness in which the maximum Q action value 'maxQ' (maximum value) retrieved becomes constantly the same. That is to say, in Step S97, the CPU 11 determines whether the practice status variable determined in the practice status determination processing of FIG. 9 is "both-hand partial practice" or not. In a case of not being "both-hand partial practice", the determination result becomes "NO" and the processing advances to Step S96, and is returned to the aforementioned Step S92 after performing the stepping operation of the action-number retrieving pointer i. In this case the a randomly changing component is not added.

On the other hand, in a case of "both-hand partial practice", the determination result in Step S97 becomes "YES", and the processing advances to Step S98, whereby a random number "0" or "1" is generated and stored in a register rnd. Then, in Step S99, the CPU 11 determines whether the random number value in the register rnd is "1" or not. In a case in which the random number value in the register rnd is "0", the determination result becomes "NO" and the processing advances to Step S96. On the other hand, in a case in which the random number in the register rnd is "1", the determination result becomes "YES" and the processing advances to Step 100. Then, the CPU 11 sets the action-number retrieving pointer i in the advice-type index and updates the index number and the processing advances to Step S96. A randomly changing component is added in this way.

While adding a randomly changing component in this way, when the CPU 11 finishes retrieving all of the actions (advice type) from the value function table 'value' [motivation][improvement][i] according to the stepping operation of the action-number retrieving pointer i, the determination result of Step S92 becomes "YES", the processing advances to Step S101, and the CPU 11 determines whether the index number is "−1" or not. In a case of "−1", the processing advances to Step S102 and the CPU 11 obtains an index number by a random number and updates the maximum Q action value 'maxQ' (maximum value). Then, the processing advances to Step S103. In Step S101, if the index number is not "−1", the processing advances to Step S103, and the CPU 11 sets the maximum Q action value 'maxQ' (maximum value) and index number to the advice-type 'action'.

Figure 15:
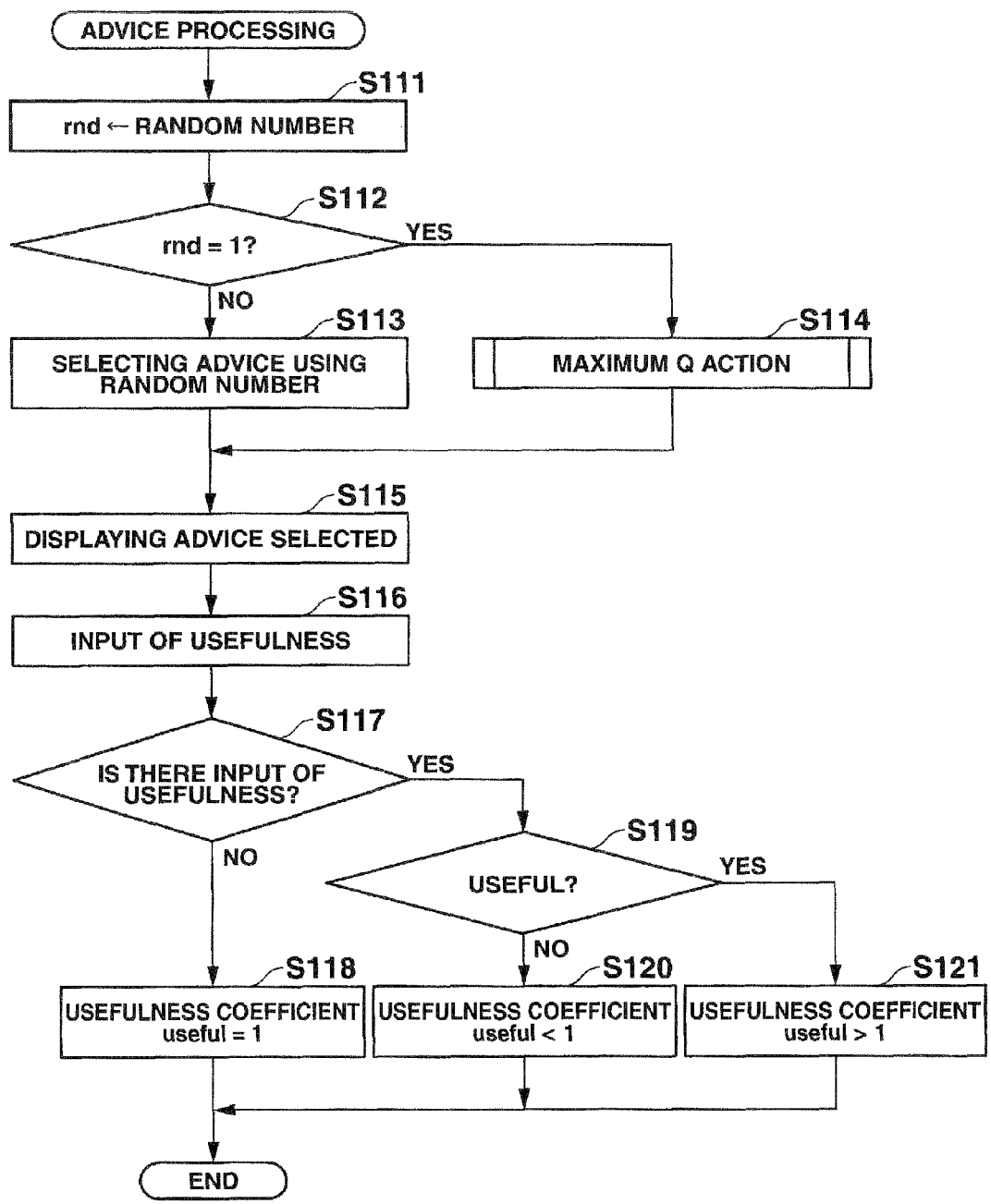
FIG. 15 is a flowchart illustrating advice processing executed in a musical performance training apparatus according to an embodiment of the present invention.

FIG. 15 is a flowchart illustrating advice processing executed in a musical performance training apparatus according to an embodiment of the present invention.

In Step S111, the CPU 11 generates the random number value of "0" or "1" and stores it in the register rnd. Then, in Step S112, the CPU 11 determines whether the random number in the register rnd is "1" or not. When the random number in the register rnd is "0", the determination result becomes "NO", and the processing advances to Step S113, and the CPU 11 generates a random number within a range of the number of the advice type and sets the random number thus generated to the advice-type 'action', and then the processing advances to Step S115 described later.

On the other hand, when the random number in the register rnd is "1", the determination result of Step S112 becomes "YES" and the processing advances to Step S114. In Step S114, the CPU 11 executes the maximum Q action processing (refer to FIG. 13) that retrieves the most effective (maximum Q action value 'maxQ') advice-type 'action' from the value function table 'value'[motivation][improvement][i], while performing the stepping operation of the action-number-retrieving pointer i, in a state designated by the motivation status variable 'motivation' and the musical performance technique status variable 'improvement', and then the processing advances to Step S115. Then, in Step S115, the CPU 11 executes advice of a type designated by the advice-type 'action'. It should be noted here that the execution of advice refers to notifying a user by displaying a phrase of advice designated by the advice-type 'action' on a screen or performing speech synthesis thereof.

In Step S116, the CPU 11 receives an input of usefulness. That is to say, the CPU 11 receives an input as to whether the advice is useful or not from the user via the input unit 15. In Step S117, the CPU 11 determines whether there has been an input of usefulness. In a case of a YES determination, the CPU 11 advances the processing to Step S119, and in a case of a NO determination, the CPU 11 advances the processing to Step S118. In Step S117, the CPU 11 determines whether the result of the input of usefulness is useful or not. In a case of a YES determination, the CPU 11 advances the processing to Step S121, and in a case of a NO determination, the CPU 11 advances the processing to Step S120.

In Step S118, the CPU 11 substitutes 1 (one) into a usefulness coefficient (useful) in a case in which there is no input of usefulness. In Step S120, the CPU 11 substitutes a value of 0 (zero) or more and less than 1 (one) into the usefulness coefficient (useful) in a case in which there is an input indicating not useful. In Step S121, the CPU 11 substitutes a value of more than 1 (one) into the usefulness coefficient (useful) in a case in which there is an input indicating useful. In this way, a user's feeling when receiving advice is reflected in the value.

FIG. 16 is a diagram illustrating an example of advice selected in a musical performance training apparatus according to an embodiment of the present invention.

In the present embodiment, there are three types of the motivation status variable (0 (zero) (low), 1 (one) (constant), and 2 (two) (high), and there are three types of the musical performance technique status variable (0 (zero) (low), 1 (one) (constant), and 2 (two) (high), which constitutes the matrix illustrated in FIG. 16. For example, in a case in which the motivation status variable is 0 (zero) (low) and the musical performance technique status variable is 0 (zero) (low), "Advice 1" is selected as advice that was effective. This matrix corresponds to each of the practice status variables.

The CPU 11 of the musical performance training apparatus of the present embodiment receives an input of a note of a musical sound; stores a keying frequency received during a predetermined unit time to be associated with a practice status variable (such as a single-hand partial practice); evaluates motivation change of a user based on the keying frequency stored for every identical practice status variable; evaluates a musical performance technique level change of a user based on the keying frequency stored for every identical practice status variable; and generates advice based on the motivation change thus evaluated and the musical performance level change for every practice status variable.

Therefore, it is possible to present more effective advice by changing advice in accordance with the change in a player's motivation and the change of a player's musical performance technique level.

The CPU 11 of the musical performance training apparatus 1 of the present embodiment extracts advice of maximum value from among a plurality of the advice-types in accordance with the motivation status variable and the musical performance technique status variable.

Therefore, it is possible to present advice of the highest value for the user in accordance with the motivation status variable and the musical performance technique status variable.

The CPU 11 of the musical performance training apparatus 1 of the present embodiment extracts advice of a type having a maximum value among a plurality of advice types registered in a value function table (rule value data) based on the Q-learning theory in accordance with the motivation status variable and the musical performance technique status variable.

Therefore, since it is possible to accumulate values of effectiveness that affect a user after presenting the advice per motivation status variable, musical performance technique status variable, and selected advice-type, the probability of selecting optimal advice in accordance with a subsequent motivation status variable and a subsequent musical performance technique status variable becomes high.

The musical performance training apparatus 1 of the present embodiment includes the input unit 15 that receives an input of usefulness of advice, and the CPU 11 changes a value of advice in accordance with the usefulness thus inputted.

Therefore, by the user inputting a value of whether the advice is useful or not, it is possible to add a psychological element (for example, the user feels that the advice is preferable) to the value of advice.

Furthermore, according to the present embodiment, a keying frequency per unit time can be used for ascertaining a motivation change by performing a comparison between the latest one and the last one, and furthermore can be used for ascertaining a comprehensive change of a user's technique by performing a relative comparison between latest and past average values.

In this enforcement learning, since it is possible to accumulate values of effectiveness that affect a user after presenting the advice per motivation status variable, musical performance technique status variable, and selected advice-type, the probability of selecting optimal advice in accordance with a subsequent motivation status variable and a subsequent musical performance technique status variable becomes high. In this regard, it is possible to avoid falling into a local optimum solution by adding a random element by a random number and presenting advice.

Regarding the values of the effectiveness, using the keying frequency per unit time leads to a measurement of a complex effect including a motivation change and a musical performance technique level change, using a change of a motivation change variable leads to a measurement of an effect influencing motivation, and using a change of a musical performance technique level change variable leads to a measurement of an effect influencing a musical performance technique level.

In a case of wanting to add to a psychological element (for example, the user feels that the advice is preferable) other than a result actually presented such as a keying frequency per unit time, it is possible to reflect this to the value by a user inputting a value of whether the advice is useful or not.

The present invention is not limited to the abovementioned embodiments and various modifications can be made within the scope of the inventions described in the claims, which are needless to say included within the scope of the present invention.

It should be noted that the steps describing the program recorded in the recording medium naturally include only processing performed chronologically in the described order, but is not necessarily processed chronologically, and also includes processing executed in parallel or separately.

In addition, in the present specification, a term system shall mean a general device configured from a plurality of devices, a plurality of means, and the like.

Although several embodiments of the present invention have been explained in the foregoing, these embodiments are merely examples, and do not limit the technical scope of the present invention. The present invention can be attained by various other embodiments, and further, various modifications such as omissions and substitutions can be made in a scope not departing from the spirit of the present invention. These embodiments and modifications thereof are included in the scope and gist of the invention described in the present specification and the like, and are encompassed in the invention recited in the attached claims and equivalents thereof.

What is claimed is:

1. A musical performance training apparatus, comprising:
   a receiver that receives note data of a musical sound supplied according to operation of a musical performance manipulandum by a player;
   a calculator that calculates a musical performance operation frequency based on the note data received by the receiver every predetermined period of time elapsed;
   a storage controller that stores in predetermined memory, each time the musical performance operation frequency is calculated by the calculator, the musical performance operation frequency calculated to be associated with any one of a plurality of practice forms;
   an evaluator that evaluates a motivation change and a musical performance technique level change of the player based on a latest musical performance operation frequency stored in the memory and a musical performance operation frequency which is stored in the memory before the latest musical performance operation frequency is stored, for each of identical practice forms; and
   an advice generator that generates advice based on the motivation change and the musical performance technique level change thus evaluated for each of the practice forms.

2. The musical performance training apparatus according to claim 1,
   wherein the advice generator includes an advice extraction unit that extracts advice of maximum value from among a plurality of advice types in accordance with the motivation change and the musical performance technique level change evaluated by the evaluator.

3. The musical performance training apparatus according to claim 2,
   wherein the advice extraction unit extracts advice of a type having a maximum value from among a plurality of advice types registered in a value function table, based on the Q-learning theory in accordance with the motivation change and the musical performance technique level change evaluated by the evaluator.

4. The musical performance training apparatus according to claim 2, further comprising:
   a usefulness input receiver that receives an input of usefulness of the advice extracted by the advice extraction unit; and
   an advice value changing unit that changes a value of the advice in accordance with the usefulness received by the usefulness input receiver.

5. The musical performance training apparatus according to claim 1,
   wherein the evaluator evaluates a motivation change of a player based on the latest musical performance operation frequency stored in the memory and the musical performance operation frequency which is stored in the memory immediately before the latest musical performance operation frequency is stored, for each of the identical practice forms.

6. The musical performance training apparatus according to claim 1, wherein the evaluator includes:
   a standard deviation calculator that reads from the memory all musical performance operation frequencies corresponding to a practice form identical to a practice form associated with the latest musical performance operation frequency and calculates an average value and standard deviation based on the musical performance operation frequency thus read;
   a deviation value calculator that calculates a deviation value based on the latest musical performance operation frequency; and
   a musical performance technique level change evaluator that evaluates a relationship between a reference value based on the average value and standard deviation thus calculated and the deviation value thus calculated, as a change of the musical performance technique level.

7. A musical performance training method, comprising:
   receiving note data of a musical sound supplied according to operation of a musical performance manipulandum by a player;
   calculating a musical performance operation frequency based on the note data received every predetermined period of time elapses;
   storing in predetermined memory, each time the musical performance operation frequency is calculated, the musical performance operation frequency calculated to be associated with any one of a plurality of practice forms;
   evaluating a motivation change and a musical performance technique level change of the player based on a latest musical performance operation frequency stored in the memory and a musical performance operation frequency which is stored in the memory before the latest musical performance operation frequency is stored, for each of identical practice forms; and
   generating advice based on the motivation change and the musical performance technique level change thus evaluated for each of the practice forms.

8. The musical performance training method according to claim 7, further comprising:
   extracting advice of maximum value from among a plurality of advice types in accordance with the motivation change and the musical performance technique level change evaluated.

9. The musical performance training method according to claim 8, further comprising:
   extracting advice of a type having a maximum value from among a plurality of advice types registered in a value function table based on the Q-learning theory in accordance with the motivation change and the musical performance technique level change evaluated.

10. The musical performance training method according to claim 8, further comprising:
   receiving an input of usefulness of the advice extracted; and
   changing a value of the advice in accordance with the usefulness received.

11. The musical performance training method according to claim 7, further comprising:
   evaluating a motivation change of a player based on the latest musical performance operation frequency stored in the memory and the musical performance operation frequency which is stored in the memory immediately before the latest musical performance operation frequency is stored, for each of the identical practice forms.

12. The musical performance training method according to claim 7, further comprising:
   reading from the memory all of the musical performance operation frequencies corresponding to a practice form identical to a practice form associated with the latest musical performance operation frequency and calculating an average value and standard deviation based on the musical performance operation frequency thus read;
   calculating a deviation value based on the latest musical performance operation frequency; and
   evaluating a relationship between a reference value based on the average value and standard deviation thus calculated and the deviation value thus calculated, as a change of the musical performance technique level.

13. A non-transitory computer readable storage medium encoded with a program for enabling a computer included in a musical performance evaluation apparatus to execute functions comprising:
   receiving note data of a musical sound supplied according to operation of a musical performance manipulandum by a player;
   calculating a musical performance operation frequency based on the note data received every predetermined period of time elapses;
   storing in predetermined memory, each time the musical performance operation frequency is calculated, the musical performance operation frequency calculated to be associated with any one of a plurality of practice forms;
   evaluating a motivation change and a musical performance technique level change of the player based on a latest musical performance operation frequency stored in the memory and a musical performance operation frequency which is stored in the memory before the latest musical performance operation frequency is stored, for each of identical practice forms; and
   generating advice based on the motivation change and the musical performance technique level change thus evaluated for each of the practice forms.

14. The non-transitory computer readable storage medium according to claim 13, wherein the generating the advice comprises:
   extracting advice of maximum value from among a plurality of advice types in accordance with the motivation change and the musical performance technique level change evaluated.

15. The non-transitory computer readable storage medium according to claim 14, wherein the extracting the advice comprises:
   extracting advice of a type having a maximum value from among a plurality of advice types registered in a value function table based on the Q-learning theory in accordance with the motivation change and the musical performance technique level change evaluated.

16. The non-transitory computer readable storage medium according to claim 14, wherein the program enables the computer to execute further functions comprising:
   receiving an input of usefulness of the advice extracted; and
   changing a value of the advice in accordance with the usefulness received.

17. The non-transitory computer readable storage medium according to claim 13, wherein the evaluating further comprises:
   evaluating a motivation change of a player based on the latest musical performance operation frequency stored in the memory and the musical performance operation frequency which is stored in the memory immediately before the latest musical performance operation frequency is stored, for each of the identical practice forms.

18. The non-transitory computer readable storage medium according to claim 13, wherein the evaluating further comprises:
   reading from the memory all of the musical performance operation frequencies corresponding to a practice form identical to a practice form associated with the latest musical performance operation frequency and calculating an average value and standard deviation based on the musical performance operation frequency thus read;
   calculating a deviation value based on the latest musical performance operation frequency; and
   evaluating a relationship between a reference value based on the average value and standard deviation thus calculated and the deviation value thus calculated, as a change of the musical performance technique level.

* * * * *